United States Patent [19]

Sasho

[11] Patent Number: 5,168,394
[45] Date of Patent: Dec. 1, 1992

[54] APPARATUS FOR GENERATING TIME INFORMATION FOR A FRAME OF VIDEO INFORMATION USING INTERPOLATION

[75] Inventor: Hidehiko Sasho, Kanagawa, Japan

[73] Assignee: Sony Corporation, Tokyo, Japan

[21] Appl. No.: 538,407

[22] Filed: Jun. 15, 1990

[30] Foreign Application Priority Data

Jun. 15, 1989 [JP] Japan .................................. 1-152839

[51] Int. Cl.⁵ ........................ H04N 5/78; G11B 27/02
[52] U.S. Cl. .................................. 360/10.3; 360/14.2; 360/72.2
[58] Field of Search ............... 360/10.3, 14.1, 14.2, 360/72.2, 137, 27; 358/311; 368/274, 10

[56] References Cited

U.S. PATENT DOCUMENTS

| | | | |
|---|---|---|---|
| 3,727,203 | 4/1973 | Crossman | 360/722 |
| 4,159,480 | 6/1979 | Tachi | 358/319 |
| 4,612,569 | 9/1986 | Ichinose | 358/22 |
| 4,663,673 | 5/1987 | Doutsubo | 360/33.1 X |
| 4,707,749 | 11/1987 | Nichijima et al. | 360/14.3 |
| 4,816,929 | 3/1989 | Bradley et al. | 360/10.1 |

FOREIGN PATENT DOCUMENTS 0259962 3/1988 European Pat. Off. .
2198873 6/1988 United Kingdom .

Primary Examiner—Andrew L. Sniezek
Attorney, Agent, or Firm—Lewis H. Eslinger; Donald S. Dowden

[57] ABSTRACT

In a time information generator for generating time information in an arbitrary frame of video information varying with changes in time on the basis of time information delivered at a predetermined time interval from a video information forming device for forming video information, there is employed a scheme to discriminate between operational modes of the video information forming device to form, by an interpolative operation, time information in an arbitrary frame of video information from time information delivered from the video information forming device every n (n=2, 3, 4, . . .) frames of video information on the basis of the result indicative of the discriminated operational mode.

7 Claims, 2 Drawing Sheets

APPARATUS FOR GENERATING TIME INFORMATION FOR A FRAME OF VIDEO INFORMATION USING INTERPOLATION

BACKGROUND OF THE INVENTION

1. Field of the Invention

This invention relates to a time information generator for generating time information in an arbitrary frame of video information varying with changes in time, and more particularly to a time information generator for generating time information by interpolative processing.

2. Description of the Prior Art

Generally, in video editing systems, in the case of controlling an equipment such as a video tape recorder, etc. by an editing machine, a time code signal as described in, e.g., U.S. Pat. No. 4,159,480 is used as time information indicating a recording position of a video signal processed by that equipment. In such a video editing system, so called a mark processing, etc. is conducted to read, e.g., a value of a time code on a video tape to display that value on a visual display screen, or take a time code at an arbitrary time into the editing machine.

In the above-mentioned video editing system, it is desirable to sense the time code as frequently as possible in equipment such as a video tape recorder, etc. in order to provide a precise time information at an arbitrary time in the editing machine. Since video information, i.e., video signals processed by the above-mentioned video tape recorder, etc. are constructed per each frame, the sensing of the time code is conventionally conducted every frame in the editing machine.

Further, also in the digital video effector for adding the video effect to a video signal outputted from a video tape recorder, etc., some video editing systems use time codes as position information for providing a special effect.

Meanwhile, some equipment such as video tape recorders, or digital video effectors, etc. controlled by an editing machine in the video editing system is constructed to suppress the response processing ability with respect to external devices in order to ensure the processing ability for the original video processing in the equipment body or the system control. In such equipment, there are instances where even if an approach is employed to carry out the sensing of time codes every frame in the editing machine, the result is not satisfactory. Accordingly, it is necessary to sense the time codes once per several frames to widen the sensing interval.

However, if the sensing interval is widened, the updating interval of time information displayed on the display screen becomes coarse, resulting in bad impression or lowered accuracy in controlling a video tape recorder, etc.

With the actual circumstances in the above-described video editing system in view, this invention contemplates providing a time information generator capable of generating a time code at an arbitrary time even if the sense interval is widened with respect to equipment having a lower response processing ability.

OBJECT

An object of this invention is to provide a time information generation for generating time information delivered every n (n=2, 3, 4, . . . ) frames from video information forming means for forming video information varying with changes in time and time information in an arbitrary frame of video information on the basis of the operational mode of the video information forming means.

SUMMARY OF THE INVENTION

In a time information generator for generating time information in an arbitrary frame of video information varying with changes in time on the basis of time information delivered every a predetermined time interval from video information forming means for forming the video information, there is employed a scheme to discriminate the operational mode of the video information forming means to generate, by an interpolative operation, time information in an arbitrary frame of video information from time information delivered from the video information forming means every n (n=2, 3, 4, . . . ) frames of the video information on the basis of the discriminated result. That is, the time information is delivered from the video information forming means every nth frame of the video information, successive ones of the nth frames being at least two frames apart.

DETAILED DESCRIPTION OF THE PREFERRED EMBODIMENTS

An embodiment of a time information device according to this invention will now be described in detail in accordance with the attached drawings.

Figure 1:
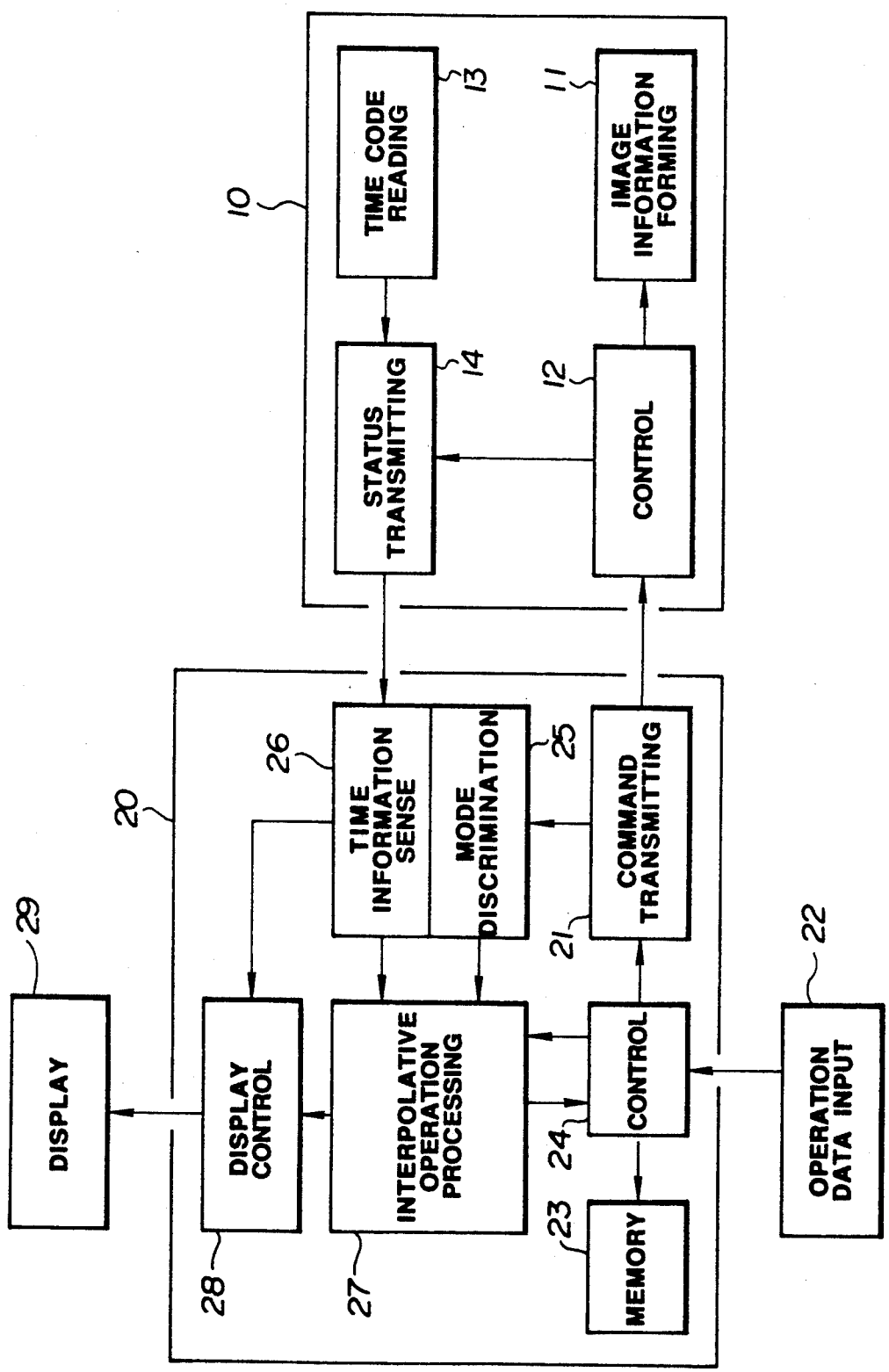
FIG. 1 is a block diagram showing an embodiment in which a time information generator of this invention is applied to the editing system.

In the embodiment shown in FIG. 1 as a block diagram, this invention is applied to an editing machine (20) for controlling a video information forming device (10) such as a video tape recorder or a digital video effector for transforming an input image to form an output image, etc. in the video editing system.

The video information forming device or unit (10) comprises an image information forming section (11), e.g., corresponding to a video playback or reproducing processing system, etc. in a video tape recorder for recording a video signal on a magnetic tape or playing it back therefrom. This video information forming section (11) forms video information varying with changes in time every frame. Further, the video information forming device (10) comprises a control section (12) for controlling the operation of the image information forming section (11), etc. This control section (12) becomes operative in response to an operating control command transmitted as a remote signal from a command transmitting section (21) of the editing machine (20). Further, this video information forming device (10) comprises a time code reading section (13) for reading, from a magnetic tape, a time code as time information indicating a current position of an image information formed at the image information forming section (11), and a status transmitting section (14) for transmitting, to the editing machine (20), a status signal indicating the time code or an operational mode, etc. of the image information forming section (11). With respect to the time information, the status transmitting section (14)

transmits it as a status signal only once every N frames. Where the video information forming unit (10) is a digital video effector, the time code reading section (13) reads time codes inputted along with an input image signal to deliver them to the status transmitting section (14).

The editing machine (20) comprises a control section (24) to which operation data is inputted from an operation data input section (22) in which a key board, etc. is used. This control section (24) carries out such an operating control as to take operation data, etc. from the operation data input section (22) into a memory (23), and/or to allow the command transmitting unit (21) to transmit an operating control command as a remote signal from the command transmitting section (21) in response to the operation data, control data stored in advance in the memory (23), or the like.

The editing machine (20) further comprises a mode discriminative section (25) and a time information sense section (26). The mode discriminative section (25) discriminates between operational modes of the image information forming section (11) on the basis of an operating control command transmitted from the command transmitting section (21) or a status signal transmitted from the status transmitting section (14) of the video information forming unit (10). Further, the time information sense section (26) senses, once every N frames, time information indicative of a current position of image information formed at the image information forming section (11) on the basis of the status signal.

The editing machine (20) comprises an interpolative operation processing section (27) for implementing an interpolation or interpolative processing of time information in an arbitrary frame of video information formed at the image information forming section (11) on the basis of the operational mode discriminated at the mode discrimination section (25) and time information sensed once every N frames at the time information sense unit (26) to allow a display section (29) to display, under the control of a display control section (28), the time information, etc. obtained by the interpolative operation processing section (27).

In this embodiment, the interpolative operation processing section (27) constitutes a time information generator according to this invention along with the mode discriminative section (25) and the time information sense section (26). This interpolative operation processing section (27) carries out, by the algorithm as indicated by the flowchart in FIG. 2, an interpolative operation for determining or deciding time information in an arbitrary frame of video information formed by the image information forming section (11).

Figure 2:
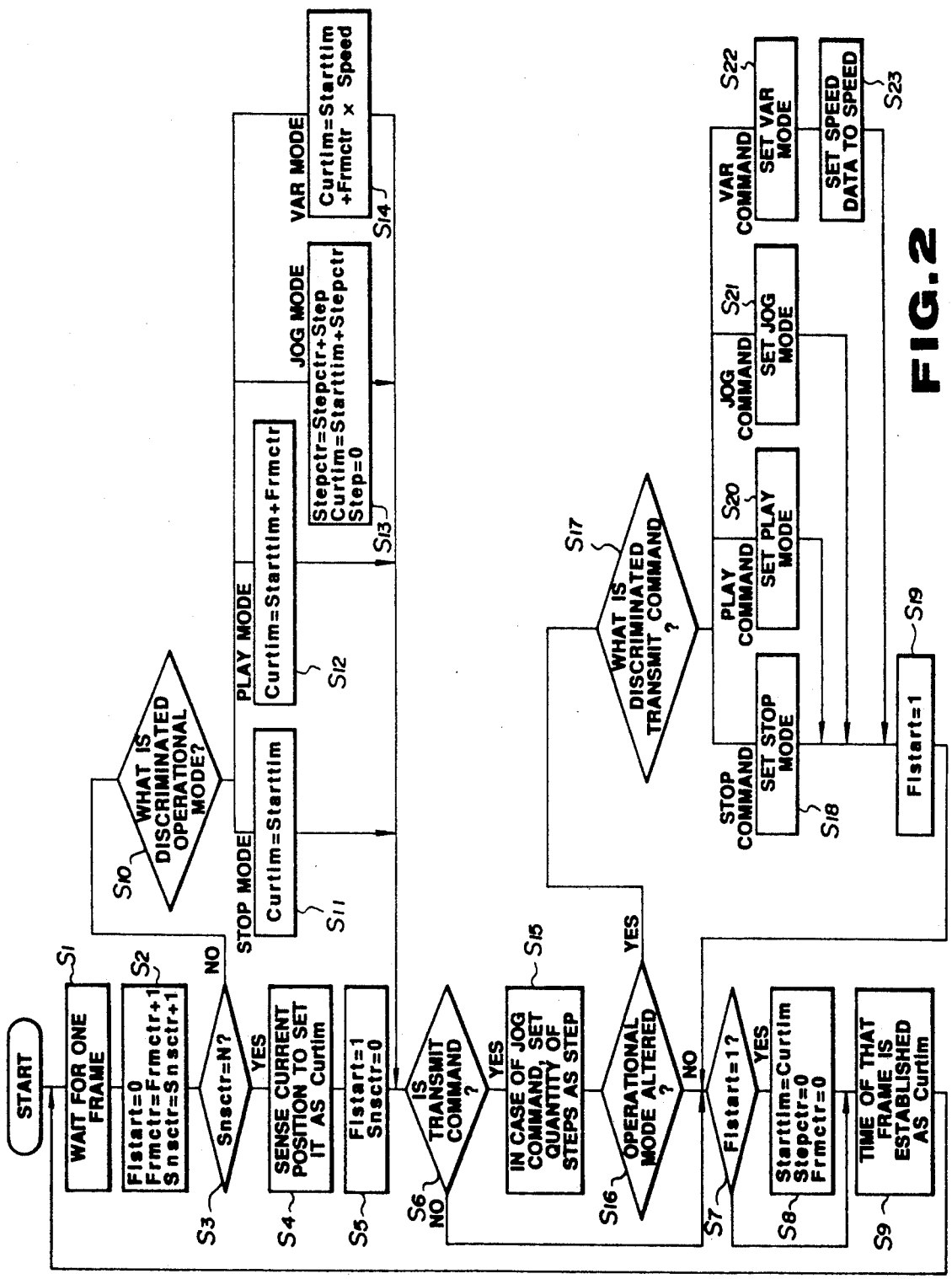
FIG. 2 is a flowchart showing the procedure for generating time information in the time information generator of this invention.

Namely, the interpolative operation processing section (27) first waits elapse of one frame from the last interpolative operation at the first step $S_1$ in the algorithm indicated by the flowchart of FIG. 2.

At second step $S_2$, a flag (Flstart) indicating start of the interpolative processing is set to zero. The value (Frmctr) of the frame counter indicative of the number of frames being subjected to interpolative processing undergoes incremental operation, and the value (Snsctr) of the sense counter for sensing time information of a current position once every N frames undergoes incremental operation.

At third step $S_3$, judgment processing as to whether the value (Snsctr) of the sense counter becomes equal to N is made.

Where a judged result at the third step $S_3$ is YES, i.e., the value (Snsctr) of the sense counter is N, the operation shifts to the fourth step $S_4$ to sense, at the time information sense section (26), time information indicative of a current position of image information formed at the image information forming section (11) of the video information forming device (10) on the basis of the status signal. Then, at the fifth step $S_5$, a flag (Flstart) indicative of start of the interpolative processing is set to 1 and the value (Snsctr) of the sense counter for sensing time information of a current position once every N frames is set to zero. Then, the operation shifts to the sixth step $S_6$.

It is to be noted that where a judged result at the third step $S_3$ is NO, i.e., the value (Snsctr) of the sense counter is not N, the operation shifts to the tenth step $S_{10}$ which will be described later to carry out discriminative processing of the operational mode of the video information forming unit (10).

At the sixth step $S_6$, judgment processing as to whether or not sending command is present is made.

Where a judged result in the sixth step $S_6$ is NO, i.e., transmit command is absent, the operation shifts to the seventh step $S_7$. In contrast, where a judged result at the sixth step $S_6$ is YES, i.e., the transmit command is present, the operation shifts to the fifteenth step $S_{15}$ which will be described later.

At the seventh step $S_7$, judgment processing as to whether or not the flag (Flstart) indicative of start of interpolative processing is equal to 1 is made.

Where a judged result at the seventh step $S_7$ is YES, i.e., the above-mentioned flag (Flstart) is equal to 1, the value (Curtim) of the register indicative of time information of a current position is set as the value (Starttim) of the register indicative of time information at the time of start of interpolation at the eighth step. The value (Stepctr) of the step counter indicative of a sum of the number of steps by the JOG command is set to zero. Further, the value (Frmctr) of the frame counter indicative of the number of frames being subjected to interpolative processing is set to zero. The operation then shifts to the ninth step $S_9$.

By repeatedly executing the first to ninth steps $S_1$ to $S_9$, time information once every N frames is established at the ninth step $S_9$ on the basis of time information sensed once every N frames at the time information sense section (26).

Further, where a judged result at the third step $S_3$ is NO, i.e., the value (Snsctr) of the sense counter does not reach N, the operation shifts to the tenth step $S_{10}$ to carry out a discriminative processing of the operational mode at the mode discriminative section (25). In this embodiment, four operational modes, namely a STOP mode for stopping formation of image information, a PLAY mode for forming image information at an ordinary speed, a JOG mode for forming image information at a speed corresponding to the content of steps of n frames, and a VAR mode for forming image information at an arbitrary constant speed, are possible in the operation of the video information forming device (10). The mode discriminative section (25) analyzes an operating control command transmitted from the command transmitting section (21) and/or a status signal transmitted from the status transmitting section (14) of the image information forming device (10) to thereby discriminate the operational mode of the video information forming unit (10).

Where a judged result of the operational mode at the tenth step $S_{10}$ indicates the STOP mode, the value (Curtim) of the register indicative of time information at a current position is set to the value (Starttim) of the register indicative of time information at the time of start of interpolation. The operation then shifts to the sixth step $S_6$ to carry out the judgment processing as to whether or not the transmit command is present.

Where a judged result of the operational mode at the tenth step $S_{10}$ is the PLAY mode, the value (Curtim) of the register indicative of time information at a current position is changed to a value obtained by adding the value (Frmctr) of the frame counter indicative of the number of frames being subjected to interpolative processing to the value (Starttim) of the register indicative of time information at the time of start of interpolation. The operation then shifts to the sixth step $S_6$ to carry out a judgment processing as to whether or not transmit command is present.

Further, where judged result of the operational mode at the tenth step $S_{10}$ is the JOG mode, at the thirteenth step $S_{13}$, the value (Stepctr) of the step counter indicative of a sum of the number of steps by the JOG command after start of interpolation is changed to a value obtained by adding the value (Step) indicative of the number of frames of the video information forming unit (10) advanced by the JOG command to the value (Stepctr) of the step counter. Moreover, the value (Curtim) of the register indicative of time information at a current position is changed to a value obtained by adding the value (Stepctr) of the step counter to the value (Starttim) of the register indicative of time information at the time of start of interpolation. After the value (Step) of the register is set to zero, the operation shifts to the sixth step $S_6$ to carry out a judgment processing as to whether or not transmit command is present.

Furthermore, where a judged result of the operational mode at the tenth step $S_{10}$ is the VAR mode, at the fourteenth step $S_{14}$, a value obtained by adding a value obtained by multiplying a value (Speed) of the register indicative of a speed by the VAR command by the value (Frmctr) of the frame counter indicative of the number of frames being subjected to interpolative processing to the value (Starttim) of the register indicative of time information at the time of start of interpolation is set as the value (Curtim) indicative of time information at a current position. The operation then shifts to the sixth step $S_6$ to carry out a judgement processing as to whether or not transmit command is present.

Where the judged result at the third step $S_3$ is NO, i.e., the value (Snsctr) of the sense counter does not reach N as stated above, the operation shifts to the tenth step $S_{10}$ to carry out processing at the eleventh to fourteenth steps $S_{11}$ to $S_{14}$ for altering, per each frame, the value (Curtim) of the register indicative of time information at a current position in dependency upon the operational mode of the video information forming device (10). In this case, since processings at the tenth to fourteenth steps $S_{10}$ to $S_{14}$ are carried out in place of the above-mentioned fourth and fifth steps $S_4$ and $S_5$, the flag (Flstart) indicative of start of the interpolation processing is held at a value of zero.

Where a judged result at the seventh step $S_7$ is NO, i.e., the flag (Flstart) is zero, the operation shifts to the ninth step $S_9$ without carrying out the processing at the eighth step $S_8$. Thus, time information of that frame is established.

Assuming now that a judged result at the sixth step $S_6$ is YES, i.e., an operating control command transmitted from the command transmitting section (21) is present, when that command designates the JOG mode, the content of steps is set to the value (Step) of the register indicative of the number of frames of the image information forming device (10), which is advanced by the JOG command at the fifteenth step $S_{15}$. The operation then shifts to the sixteenth step $S_{16}$ to carry out a judgment processing as to whether or not the processing for altering the operational mode is required.

When a judged result at the sixteenth step $S_{16}$ is NO, i.e., no processing for altering the operational mode is required, the operation returns to the seventh step $S_7$. In contrast, when that judged result is YES. i.e., the processing for altering the operational mode is required, the operation shifts to the seventeenth step $S_{17}$.

At the seventeenth step $S_{17}$, discriminative processing for discriminating the kind of an operating control command transmitted from the command transmitting section (21) is carried out.

When an operating control command transmitted is judged to be the STOP command as a result of the discriminative processing at the seventeenth step $S_{17}$, the STOP mode is set at the eighteenth step $S_{18}$. The operation then shifts to the nineteenth step $S_{19}$ to set the flag (Flstart) indicative of the start of interpolative processing to 1 to return to the seventh step $S_7$.

When an operating control command transmitted is judged to be the PLAY command as a result of the discriminative processing at the seventeenth step $S_{17}$, the PLAY mode is set at the twentieth step $S_{20}$. The operation then shifts to the nineteenth step $S_{19}$ to set the flag (Flstart) to 1 to return to the seventh step $S_7$.

Further, when an operating control command transmitted is judged to be the JOG command as a result of the discriminative processing at the seventeenth step $S_{17}$, the JOG mode is set at the twenty first step $S_{21}$. The operation then shifts to the nineteenth step $S_{19}$ to set the flag (Flstart) to 1 to return to the seventh step $S_7$.

Furthermore, when an operating control command transmitted is judged to be the VAR command as a result of the discriminative processing at the seventeenth step $S_{17}$, the VAR mode is set at the twenty second step $S_{22}$, and speed data of the VAR command transmitted as a value (Speed) of the register indicative of a speed in the VAR mode is set at the twenty third step $S_{23}$. The operation then shifts to the nineteenth step $S_{19}$ to set the flag (Flstart) to 1 to return to the seventh step $S_7$.

When an operating control command transmitted from the command transmitting section (21) is present as stated above, the processing for altering the operational mode is conducted in dependency upon that operating control command, thereby making it possible to carry out an interpolative operation processing corresponding to the operational mode to precisely interpolate, every frame, on the editing machine (20) side, time information indicative of a current position of image information formed in various operational modes at the image information forming device (10).

Accordingly, this embodiment can update, every frame, in the editing machine (20), time information displayed on a display screen of the display section (29) to carry out time display with a good impression. Further, it is possible to make a marking at an arbitrary time to take time information into the memory (23) with high accuracy.

In accordance with time information generator according to this invention, an approach is employed to discriminate, at the discriminative processing means, the operational mode of the video information forming device for forming video information varying with changes in time every frame to carry out, at the interpolative operation processing means, interpolative operation processing corresponding to the operational mode of the video information forming device in dependency upon a discriminated output by the discriminative processing means, thereby making it possible to form time information in an arbitrary frame of video information formed in the video information forming device.

Accordingly, when this invention is applied to, e.g., an editing machine of a video editing system, even if the sense interval of time codes is widened with respect to equipment having a low response processing ability, it is possible to generate time information with a high accuracy at an arbitrary time point on the editing machine side. Accordingly, this makes it possible to carry out a marking work with a high accuracy, and to display time information with a good impression.

I claim:

1. A time information generator for generating time information in an arbitrary frame of video information varying with changes in time on the basis of time information delivered at a predetermined interval from video information forming means for forming said video information, said time information generator comprising:

mode discrimination means for discriminating between operational modes of said video information forming means, said operational modes including a PLAY mode and at least one other mode exclusive of a STOP mode;

time information sense means for receiving time information from said video information forming means every nth frame of said video information, successive ones of the nth frames being at least two frames apart; and interpolation means responsive to an output signal from said mode discrimination means and an output signal from said time information sense means to perform an interpolation corresponding to a discriminated one of said operational modes to generate time information corresponding to a frame of said video information which is between successive ones of the nth frames.

2. A time information generator for generating time information in an arbitrary frame of video information on the basis of time information delivered at a predetermined time interval from a playback device for playing back video information from a magnetic tape, said time information generator comprising:

mode discrimination means for discriminating between operational modes of said playback device, said operational modes including a PLAY mode and at least one other mode exclusive of a STOP mode;

time information sense means for receiving time information from said playback device very nth frame of said video information, successive ones of the nth frames being at least two frames apart; and interpolation means responsive to an output signal from said mode discrimination means and an output signal from said time information sense means to perform an interpolation corresponding to a discriminated one of said operational modes to generate time information corresponding to a frame of said video information which is between successive ones of the nth frames.

3. A time information generator as set forth in claim 2 wherein said discrimination means identifies, besides the PLAY mode, a JOG mode, or a VARIABLE SPEED mode as the discriminated one of the operational modes of said playback device.

4. A time information generator as set forth in claim 2 wherein said interpolation means responds to an output signal from said time information sense means to add an interpolated value to time information delivered from said playback device to thereby generate time information in an arbitrary frame.

5. A time information generator as set forth in claim 2 wherein said time information is in the form of a time code signal.

6. A time information generator as set forth in claim 3 wherein, when the discriminated one of said operational modes is the PLAY mode, said interpolation means outputs, as current time information, a value obtained by adding a time corresponding to one frame of said video information to time information determined by the last interpolation; and when the discriminated one of said operational modes is the JOG mode or the VARIABLE SPEED mode, said interpolation means outputs, as current time information, a value obtained by adding a time corresponding to a running speed of said magnetic tape to time information determined by the last interpolation.

7. A time information generator for generating time information in an arbitrary frame of video information indicative of an input image on the basis of time information delivered at a predetermined time interval from a digital video effector for transforming the input image to form an output image, said time information generator comprising:

mode discrimination means for discriminating between operational modes of said digital video effector, said operational modes including a PLAY mode and at least one other mode exclusive of a STOP mode;

time information sense means for receiving time information from said digital video effector every nth frame of said video information, successive ones of the nth frames being at least two frames apart; and interpolation means responsive to an output signal from said mode discrimination means and an output from said time information sense means to perform an interpolation corresponding to a discriminated one of the operational modes to generate time information corresponding to a frame of said video information which is between successive ones of the nth frames.

* * * * *